United States Patent
Chang et al.

(10) Patent No.: US 10,908,650 B1
(45) Date of Patent: Feb. 2, 2021

(54) UNIVERSAL ELASTIC JOINT FOR PORTABLE COMPUTER

(71) Applicant: DELL PRODUCTS, LP, Round Rock, TX (US)

(72) Inventors: Chris Chang, Sanxia District (TW); Bruce Hw Chen, New Taipei (TW); Rick Wu, Taipei (TW); Maggie Mei-Chih Wu, Taipei (TW); Chen Yu Hsu, Taipei (TW); Yue Hui Jiang, Shanghai (CN)

(73) Assignee: Dell Products, L.P., Round Rock, TX (US)

( * ) Notice: Subject to any disclaimer, the term of this patent is extended or adjusted under 35 U.S.C. 154(b) by 0 days.

(21) Appl. No.: 16/782,542

(22) Filed: Feb. 5, 2020

(51) Int. Cl.
*G06F 1/16* (2006.01)
*H04M 1/02* (2006.01)

(52) U.S. Cl.
CPC ........ *G06F 1/1656* (2013.01); *H04M 1/0249* (2013.01); *G06F 2200/1631* (2013.01)

(58) Field of Classification Search
CPC combination set(s) only.
See application file for complete search history.

(56) References Cited

U.S. PATENT DOCUMENTS

| | | | | |
|---|---|---|---|---|
| 5,349,438 A | * | 9/1994 | Solomon | G01B 9/02061 356/455 |
| 5,513,828 A | * | 5/1996 | Solomon | G01J 3/0202 248/466 |
| 5,588,632 A | * | 12/1996 | Solomon | G01B 9/02041 248/466 |
| 6,791,825 B1 | | 9/2004 | Taylor | |
| 7,782,598 B2 | * | 8/2010 | Yu | H04M 1/0202 361/679.01 |
| 9,504,170 B2 | * | 11/2016 | Rothkopf | H05K 5/0017 |
| 2009/0257189 A1 | | 10/2009 | Wang et al. | |
| 2013/0271807 A1 | * | 10/2013 | Nitsche | B81B 7/02 359/221.2 |
| 2017/0092884 A1 | * | 3/2017 | Zhang | G06F 3/0412 |

\* cited by examiner

*Primary Examiner* — Lisa Lea-Edmonds
(74) *Attorney, Agent, or Firm* — Larson Newman, LLP

(57) ABSTRACT

A mobile computing system includes a case and a frame installed into the case. The components of the mobile computing system are affixed to the frame. The frame includes a first section and a second section. The first section is flexibly coupled to the second section by at least one first flexible joint and is not otherwise rigidly coupled to the second section. The frame is fabricated as a single molded piece.

20 Claims, 7 Drawing Sheets

502

504

UNIVERSAL ELASTIC JOINT FOR PORTABLE COMPUTER

FIELD OF THE DISCLOSURE

This disclosure generally relates to information handling systems, and more particularly relates to a universal elastic joint for a portable computer.

BACKGROUND

As the value and use of information continues to increase, individuals and businesses seek additional ways to process and store information. One option is an information handling system. An information handling system generally processes, compiles, stores, and/or communicates information or data for business, personal, or other purposes. Because technology and information handling needs and requirements may vary between different applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, reservations, enterprise data storage, or global communications. In addition, information handling systems may include a variety of hardware and software resources that may be configured to process, store, and communicate information and may include one or more computer systems, data storage systems, and networking systems.

SUMMARY

A mobile computing system may include a case and a frame installed into the case. The components of the mobile computing system may be affixed to the frame. The frame may include a first section and a second section. The first section may be flexibly coupled to the second section by at least one first flexible joint and is not otherwise rigidly coupled to the second section. The frame may be fabricated as a single molded piece.

BRIEF DESCRIPTION OF THE DRAWINGS

It will be appreciated that for simplicity and clarity of illustration, elements illustrated in the Figures have not necessarily been drawn to scale. For example, the dimensions of some of the elements are exaggerated relative to other elements. Embodiments incorporating teachings of the present disclosure are shown and described with respect to the drawings presented herein, in which.

The use of the same reference symbols in different drawings indicates similar or identical items.

DETAILED DESCRIPTION OF DRAWINGS

The following description in combination with the Figures is provided to assist in understanding the teachings disclosed herein. The following discussion will focus on specific implementations and embodiments of the teachings. This focus is provided to assist in describing the teachings, and should not be interpreted as a limitation on the scope or applicability of the teachings. However, other teachings can certainly be used in this application. The teachings can also be used in other applications, and with several different types of architectures, such as distributed computing architectures, client/server architectures, or middleware server architectures and associated resources.

Figure 1:
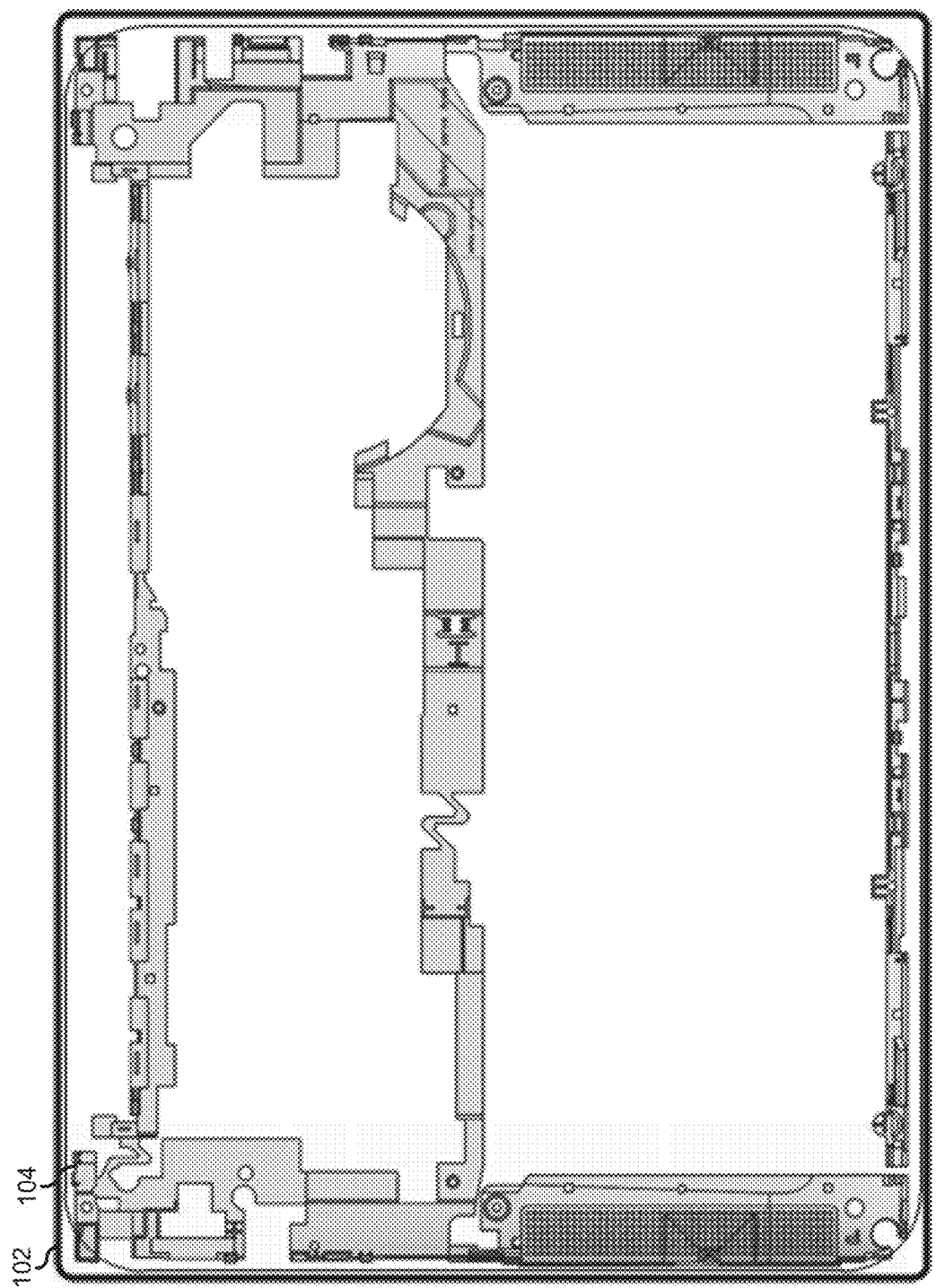
FIG. 1 is a cross-sectional view of an information handling system according to the prior art.

FIG. 1 illustrates an information handling system 100 according to the prior art. Information handling system 100 includes a case 102 and a mounting frame 104. Frame 104 represents an interior component of information handling system 100, which is installed into case 102, and to which other component parts of the information handling system are affixed. For example, frame 104 can be a first component installed into case 102 during an assembly process of information handling system 100, and to which other component parts of the information handling system are affixed, such as a main circuit board, a mass storage device, a keyboard interface, a touch-pad interface, or other component parts, as needed or desired. Here, after the component parts are affixed to frame 104, a covering bezel can be affixed to case 102, enclosing frame 104 and the component parts that are affixed thereon. In another example, a portion of the component parts of information handling system 100 can be installed into case 102 prior to the installation of frame 104, and the frame can be affixed to the case, or to the portion of the component parts that are installed therein, as needed or desired. Thereafter, other component parts of information handling system 100 can be affixed to frame 104 prior to the covering bezel being affixed to the case. In either case, case 102, frame 104, and the component parts of information handling system 100 can be affixed together by any suitable mechanism, such as by mechanical fasteners or latches, by epoxy bonding, by compression (snap) fitting, or by other methods for affixing the elements together, as needed or desired.

Frame 104 may include a plastic case or another material, as needed or desired, and may be fabricated by a molding process, such as an injection molding process or the like. It will be understood that molded plastic parts may be subject to shrinkage after removing the parts from the mold. For example, a typical molded part for a laptop computer system may experience shrinkage of around 0.00-0.20 millimeter (mm) between the time the part is removed from the mold and the time the part is installed into the laptop computer system. However, in a typical laptop computer system, it will be understood that a tolerance of <0.10 mm may be typical for the component parts. Thus, where the frame is a single piece part, such as illustrated by frame 104, much care must be given to ensuring that the shrinkage experienced by the frame is neither too low, resulting in a frame that will not fit within case 102, nor too great, resulting in a frame that is too loose within the case, and typical parts loss rates due to incorrectly sized parts may be high.

Figure 2:
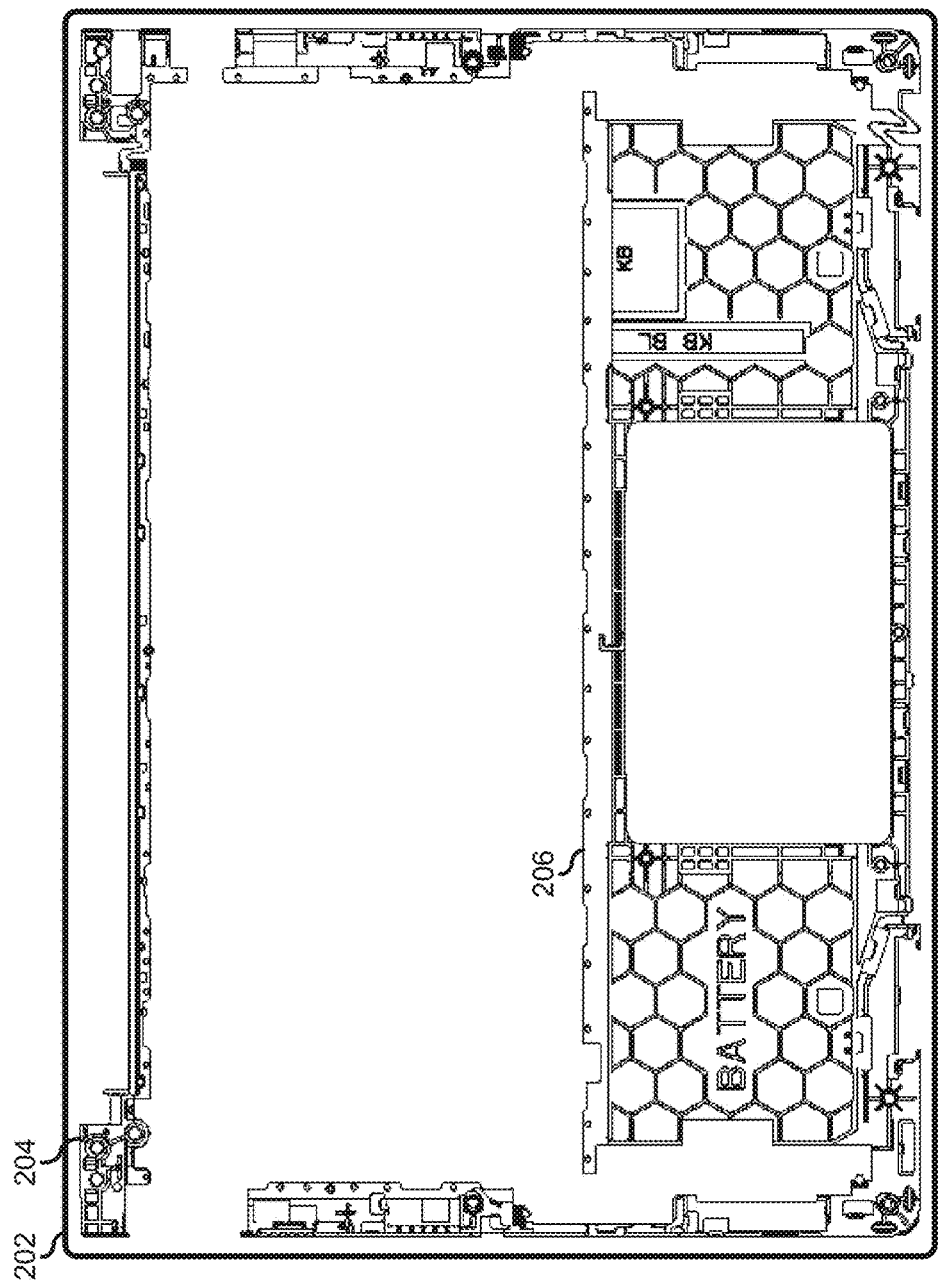
FIG. 2 is a cross-sectional view of another information handling system according to the prior art.

FIG. 2 illustrates another information handling system 200 according to the prior art. Information handling system 200 is similar to information handling system 100, and includes a case 202, a mounting frame piece 204, and a mounting frame piece 206. Case 202 is similar to case 102, in that the other component parts of information handling system 200 are installed therein, as described above. Frame pieces 204 and 206 are similar to frame 104, being installed into case 202, and to which other parts of information handling system 200 are affixed, as described above. It will be understood that frame pieces 204 and 206 may be representative of two or more frame pieces, as needed or desired. Here, the issues as described with respect to frame 102 are cured by splitting a frame into frame pieces 204 and 206. That is, by planning for a variable gap between frame pieces 204 and 206, a better fit can be ensured, even in the face of shrinkage problems with the molding process as described above. However, information handling system 200's solutions to the problems with information handling system 100 come with trade-offs. In particular, the addition of multiple frame pieces results in the management of a larger bill of materials, and all of the problems that come therewith, such as supply chain management, inventory, and the like. Further, while the shrinkage issues may be mitigated in terms of the fit of frame pieces 204 and 206 into case 202, there may be additional issues with matching of the frame pieces to each other. That is, there may be additional problems with finding frame pieces that have similar shrinkage to each other. Moreover, information handling system 200 may result in a more complicated assembly process than would be needed for handling a single frame piece.

Figure 3:
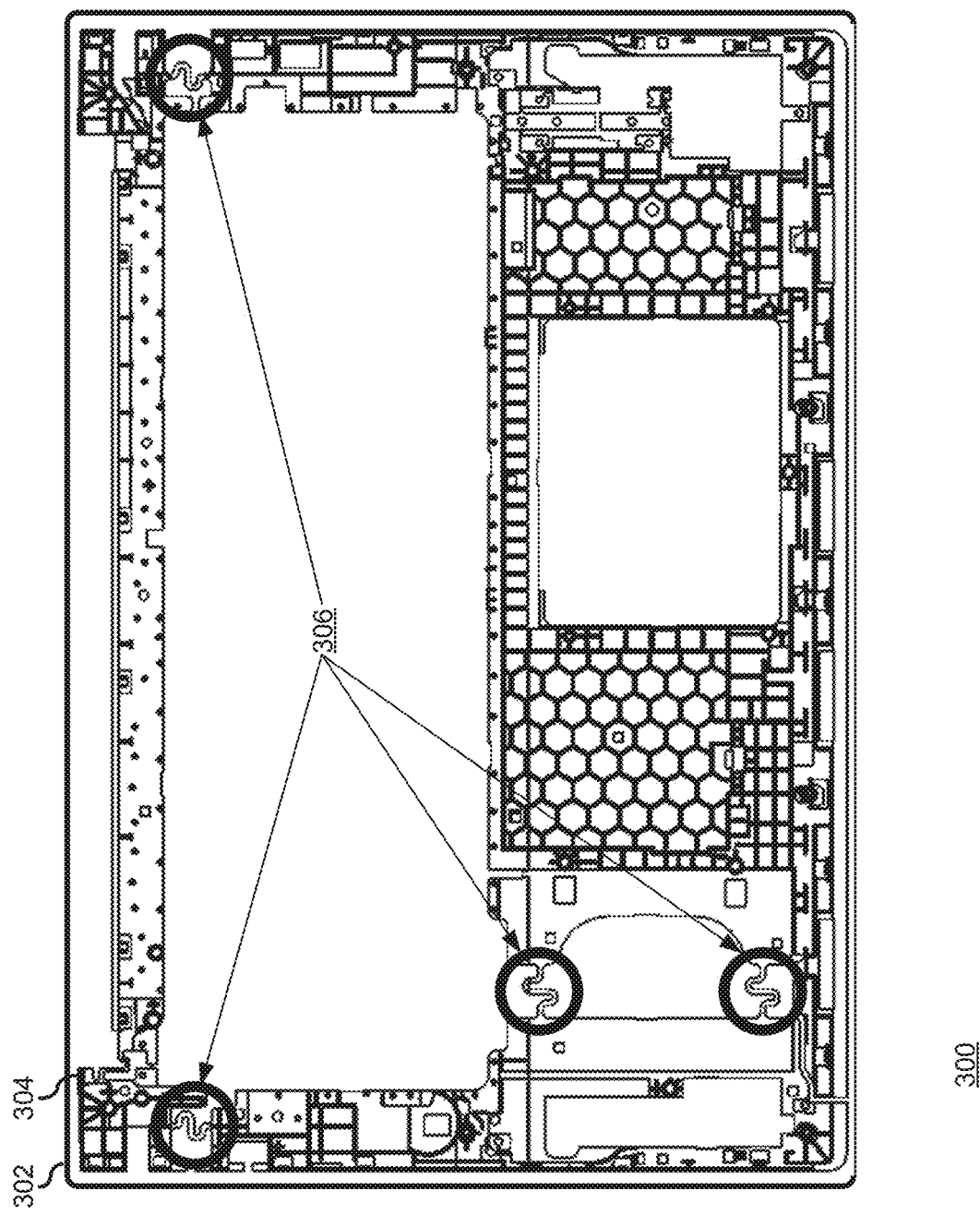
FIG. 3 is a cross-sectional view of an information handling system according to an embodiment of the present disclosure.

FIG. 3 illustrates an information handling system 300 according to an embodiment of the present disclosure. Information handling system 300 includes a case 302 and a mounting frame 304. Information handling system 300 may represent a laptop computer system, a tablet system, a mobile device such as a cell phone, or the like. Here, information handling system 300 typically represents a mobile device where close fitting of the component parts of the information handling system are expected to be firmly fitted such that movement of the information handling system does not result in loosely fitting component parts rattling or otherwise moving when the information handling system is in motion. Case 302 represents an outer shell of information handling system 300, into which other component parts of the information handling system are installed. Case 302 may include a metal case, such as an aluminum or steel case, a plastic case, or another material, as needed or desired. In a particular embodiment, case 302 represents a bottom case of information handling system 300.

Case 302 is similar to cases 102 and 202, in that the other component parts of information handling system 300 are installed therein, as described above. Frame 304 is similar to frame 104 and to frame pieces 204 and 206, being installed into case 302, and to which other parts of information handling system 300 are affixed, as described above. However, frame 304 combines the advantages of being fabricated as a single piece, similarly to frame 104, with the flexible fitting features of a two-piece design like frame pieces 204 and 206. In particular, frame 304 mitigates the effects of shrinkage and provides flexible fitting by including elastic joints 306 that permit the dimensions of the frame to be varied as needed to provide an optimal fit.

Figure 4:
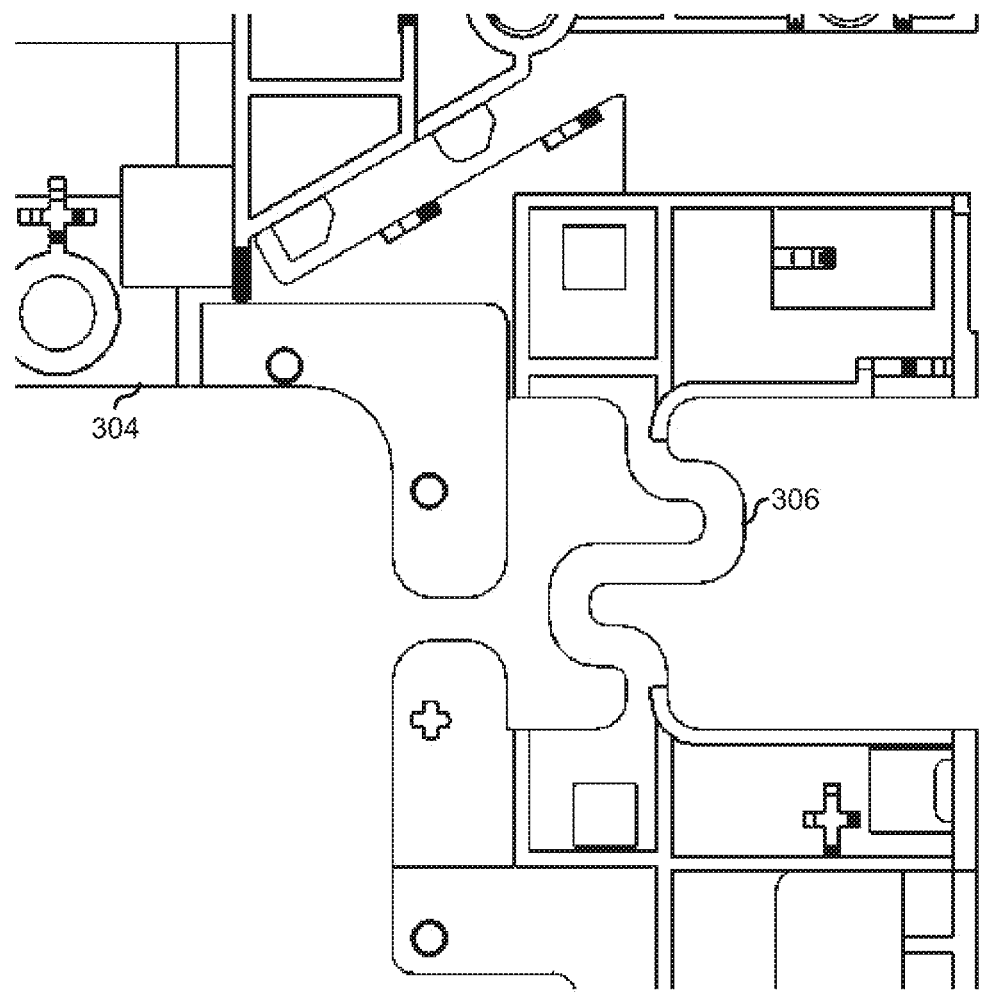
FIG. 4 is a cross-sectional view of a flexible joint of a frame of the information handling system of FIG. 3.

FIG. 4 is an enlarged view of frame 304 and one of elastic joints 306. Here, by attaching what would otherwise be separate frame pieces together using elastic joint 306, frame 304 can be fabricated as a single piece. However, elastic joint 306 is designed as a section of frame 306 that has a reduced cross-section in order to be flexible, being expanded or compressed as needed to create a frame with the optimal fit. Here, elastic joint 306 is shown having an S-shape, with a top portion of the S-shape being attached to what would otherwise be a first frame piece similar to frame piece 204, and with the a bottom portion of the S-shape being attached to what would otherwise be a second frame piece similar to frame piece 206. Here, elastic joint 306 is flexible both in a direction along an axis of the flexible joint, that is, orthogonally to the gap separating the sections of frame 304, and in a direction perpendicular to the axis of the flexible joint, that is, parallel to the gap separating the sections of the frame.

In fitting frame 304 into case 302, the separate sections of the frame can be expanded or compressed as needed to fit within the case. For example, a bottom section of the frame 304 can be affixed into an optimal location within case 302 first, and then the top section of the frame can be pulled apart or pressed together with respect to the bottom section in order to affix the top section into an optimal location within the case. Here, the optimal locations can be ascertained based upon a fitting tolerance, such as 0.10 mm from an edge of case 302, or another tolerance, as needed or desired. Alternatively, the top section of frame 304 can be affixed first, and then the bottom section can be pulled apart or pressed together in order to affix the bottom section. In either case, the optimal locations may be determined based upon a pilot pin/pilot hole arrangement between case 302 and frame 304, as needed or desired, based upon guide structures within either the case or the frame, or based upon other fitting structures, as needed or desired. Further, one or more of the sections of frame 304 can be bonded to frame 302, as needed or desired, once the respective sections are optimally located within the case, in order to maintain the optimal fit of the frame into the case.

In a particular embodiment, frame 302 is designed and fabricated with the intent that any shrinkage experienced by the frame results in an exact fit into the optimal location for the frame. That is, the expected shrinkage may be expected to size frame 304 to the optimum size for case 302, and any variance in the amount of shrinkage of the frame may then be accounted for by either compressing flexible joints 306 together if the actual shrinkage is less than the expected shrinkage, or expanding the flexible joints apart if the actual shrinkage is greater than the expected shrinkage. In another embodiment, frame 302 is designed and fabricated with the intent that any shrinkage experienced by the frame results in a frame that is too large to fit within the optimal location within frame 302. Here, it will be expected that any variance in the amount of shrinkage of frame 304 will be managed in all cases by compressing flexible joints 306 together, and the amount of compression will automatically adjust for variances in the shrinkage of the frame. In another embodiment, frame 302 is designed and fabricated with the intent that any shrinkage experienced by the frame results in a frame that is too small to fit within the optimal location within frame 302. Here, it will be expected that any variance in the amount of shrinkage of frame 304 will be managed in all cases by expanding flexible joints 306 apart, and the amount of expansion will automatically adjust for variances in the shrinkage of the frame. It will be understood that the inclusion of multiple flexible joints 306 at various locations of frame 304 may permit to mitigate uneven shrinkage of the frame, and that one or more of the flexible joints may be compressed, while one or more other of the flexible joints may be expanded within the same frame.

Figure 5:
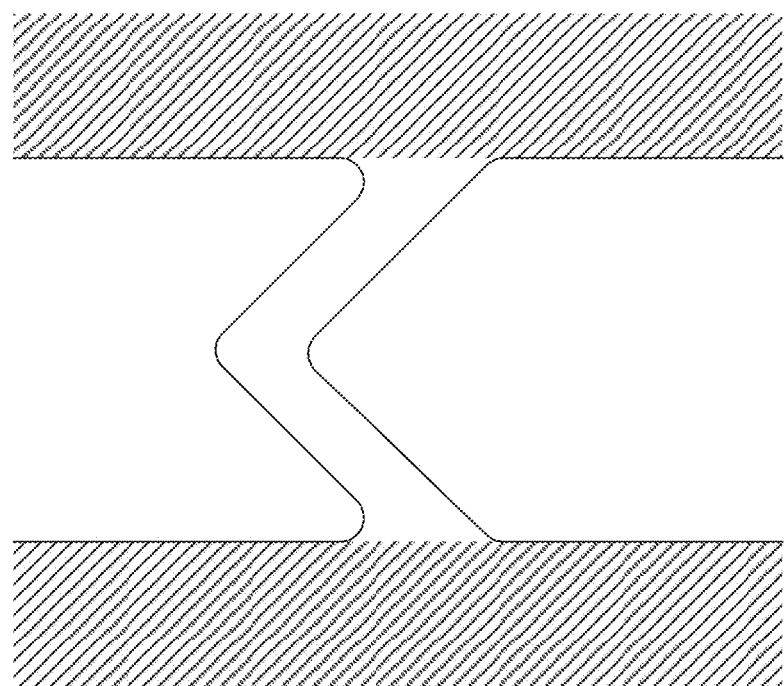
FIG. 5 is a cross-sectional view of flexible joints according to various embodiments of the present disclosure.
Figure 5:
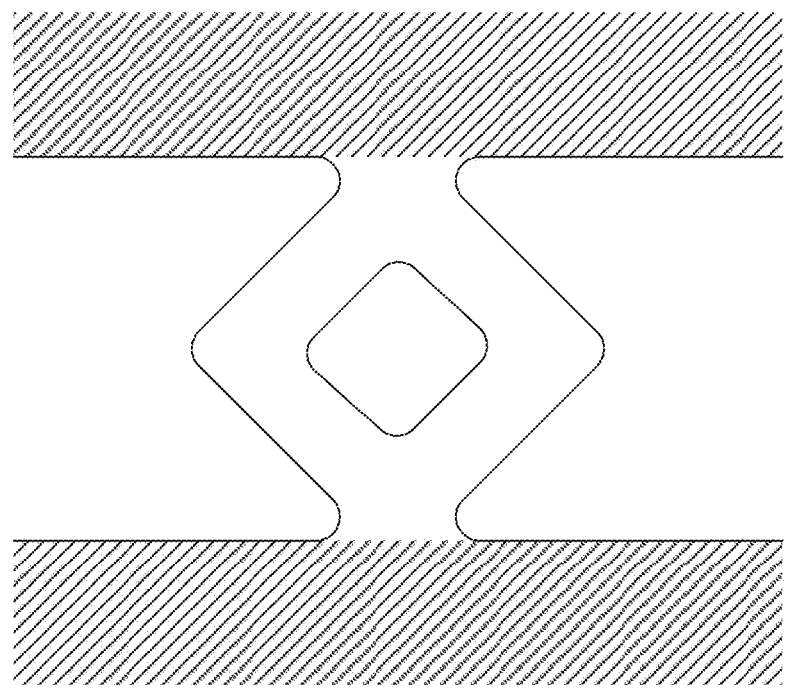

FIG. 5 illustrates other embodiments of flexible joints 502 and 504. Flexible joint 502 is provided in a V-shape with a top portion of the V-shape being attached to what would otherwise be a first frame piece similar to frame piece 204, and with the a bottom portion of the V-shape being attached to what would otherwise be a second frame piece similar to frame piece 206. Flexible joint 504 is provided in a diamond-shape with a top corner of the diamond-shape being attached to what would otherwise be a first frame piece similar to frame piece 204, and with the a bottom corner of the diamond-shape being attached to what would otherwise be a second frame piece similar to frame piece 206. Here, elastic joints 502 and 504 will be understood to be flexible both in a direction along an axis of the flexible joint, that is, orthogonally to the gap separating the sections of the frame, and in a direction perpendicular to the axis of the flexible joint, that is, parallel to the gap separating the sections of the frame.

Figure 6:
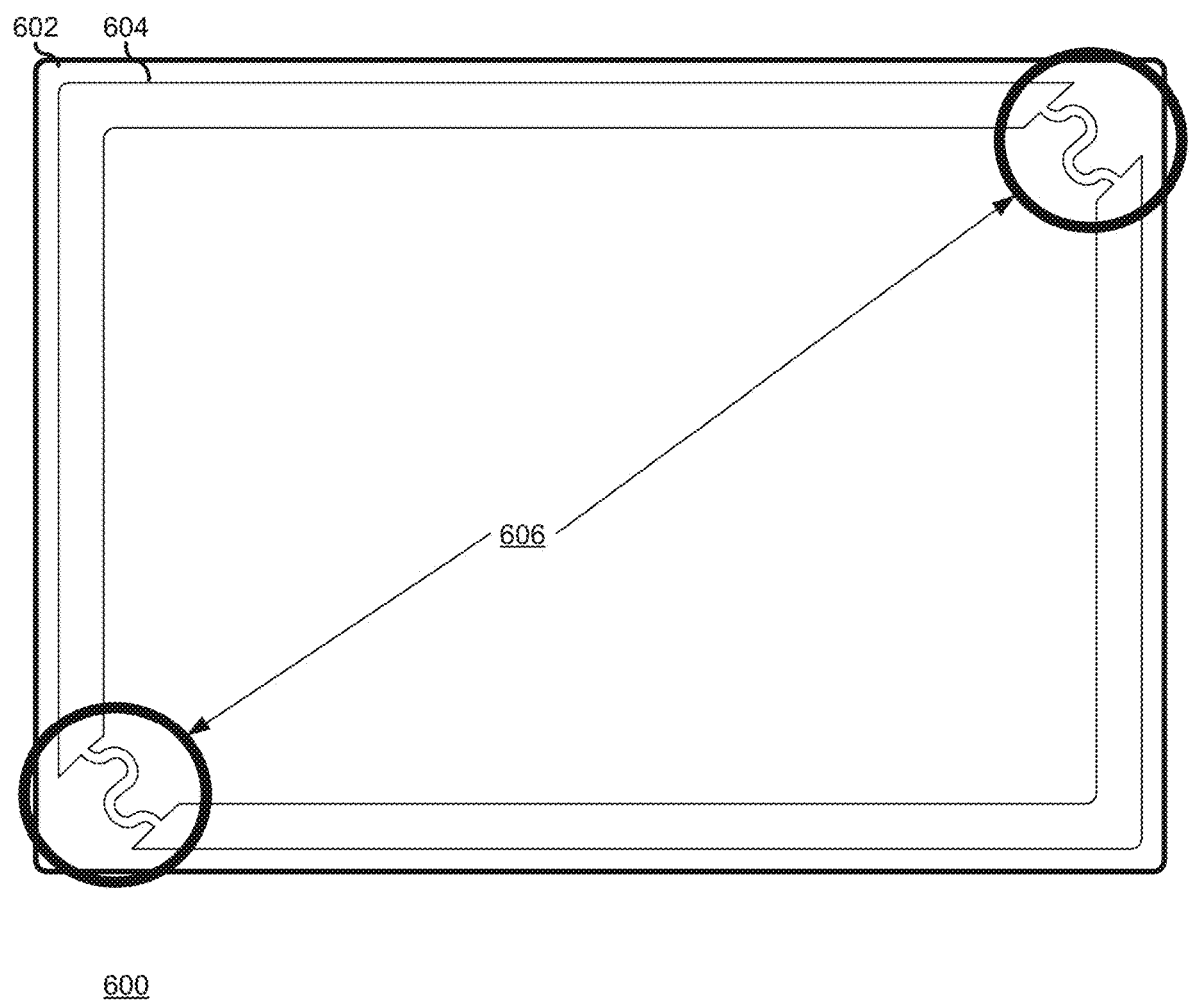
FIG. 6 is a cross-sectional view of an information handling system according to another embodiment of the present disclosure.

FIG. 6 illustrates an information handling system 600 according to an embodiment of the present disclosure. Information handling system 600 is similar to information handling systems 100, 200, and 300, and includes a case 602 and a mounting frame 604. Case 602 is similar to cases 102, 202, and 302, in that the other component parts of information handling system 600 are installed therein, as described above. Frame 604 is similar to frames 104 and 304, and to frame pieces 204 and 206, being installed into case 602, and to which other parts of information handling system 600 are affixed, as described above. However, frame 604 combines the advantages of being fabricated as a single piece, similarly to frame 104, with the flexible fitting features of a two-piece design like frame pieces 204 and 206, and in this way is similar to frame 304. In particular, frame 604 mitigates the effects of shrinkage and provides flexible fitting by including elastic joints 606 that permit the dimensions of the frame to be varied as needed to provide an optimal fit. Here, elastic joints 606 are situated at an angle such that in compression or expansion, the parts of frame 640 are moved in a diagonal with respect to the major axes.

Figure 7:
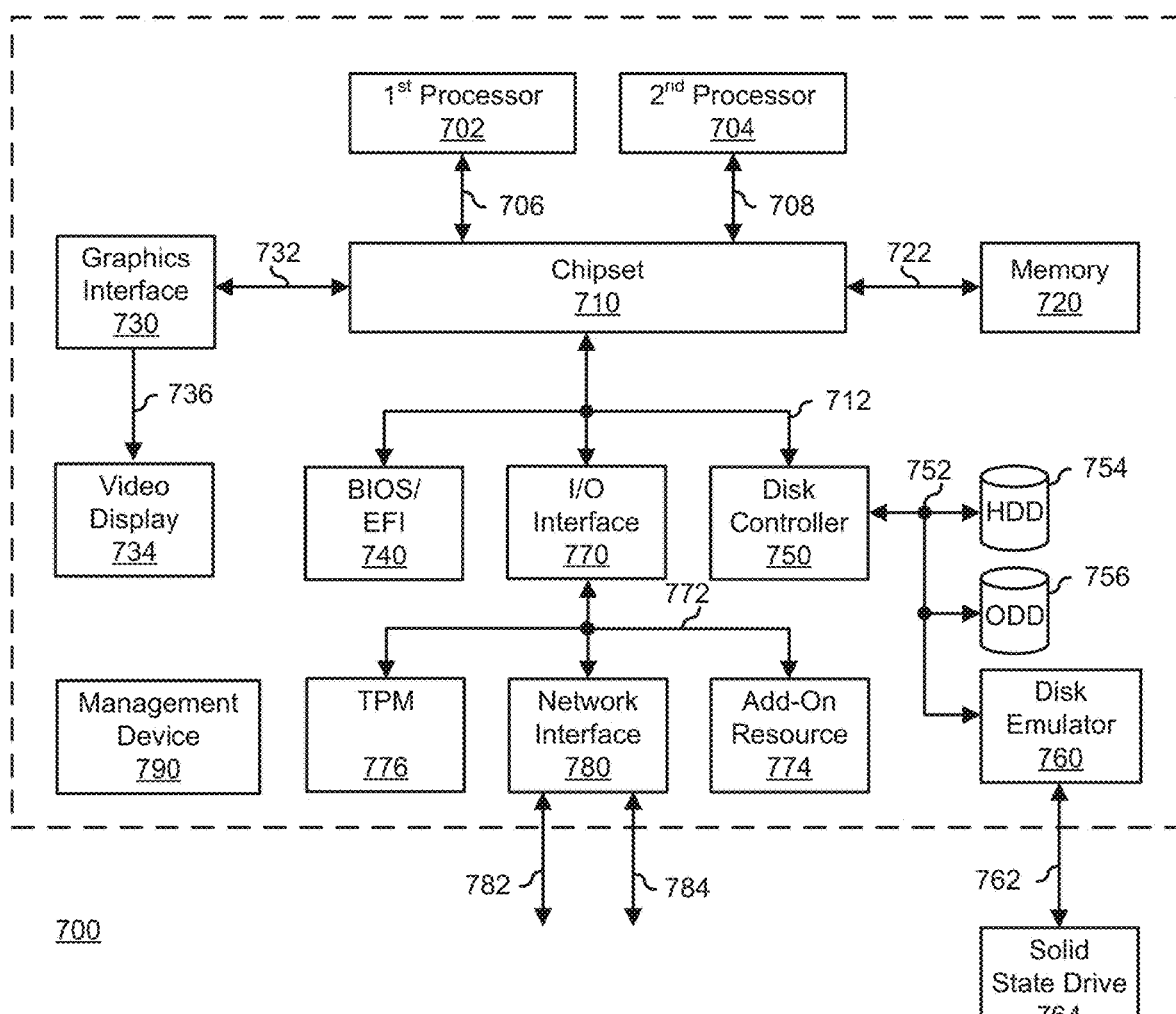
FIG. 7 is a block diagram illustrating an information handling system according to another embodiment of the present disclosure.

FIG. 7 illustrates a generalized embodiment of an information handling system 700 similar to information handling system 100. For purpose of this disclosure an information handling system can include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, information handling system 700 can be a personal computer, a laptop computer, a smart phone, a tablet device or other consumer electronic device, a network server, a network storage device, a switch router or other network communication device, or any other suitable device and may vary in size, shape, performance, functionality, and price. Further, information handling system 700 can include processing resources for executing machine-executable code, such as a central processing unit (CPU), a programmable logic array (PLA), an embedded device such as a System-on-a-Chip (SoC), or other control logic hardware. Information handling system 700 can also include one or more computer-readable medium for storing machine-executable code, such as software or data. Additional components of information handling system 700 can include one or more storage devices that can store machine-executable code, one or more communications ports for communicating with external devices, and various input and output (I/O) devices, such as a keyboard, a mouse, and a video display. Information handling system 700 can also include one or more buses operable to transmit information between the various hardware components.

Information handling system 700 can include devices or modules that embody one or more of the devices or modules described below, and operates to perform one or more of the methods described below. Information handling system 700 includes a processors 702 and 704, a chipset 710, a memory 720, a graphics interface 730, a basic input and output system/universal extensible firmware interface (BIOS/UEFI) module 740, a disk controller 750, a hard disk drive (HDD) 754, an optical disk drive (ODD) 756, a disk emulator 760 connected to an external solid state drive (SSD) 762, an input/output (I/O) interface 770, one or more add-on resources 774, a trusted platform module (TPM) 776, a network interface 780, a management device 790, and a power supply 795. Processors 702 and 704, chipset 710, memory 720, graphics interface 730, BIOS/UEFI module 740, disk controller 750, HDD 754, ODD 756, disk emulator 760, SSD 762, I/O interface 770, add-on resources 774, TPM 776, and network interface 780 operate together to provide a host environment of information handling system 700 that operates to provide the data processing functionality of the information handling system. The host environment operates to execute machine-executable code, including platform BIOS/UEFI code, device firmware, operating system code, applications, programs, and the like, to perform the data processing tasks associated with information handling system 700.

In the host environment, processor 702 is connected to chipset 710 via processor interface 706, and processor 704 is connected to the chipset via processor interface 708. Memory 720 is connected to chipset 710 via a memory bus 722. Graphics interface 730 is connected to chipset 710 via a graphics interface 732, and provides a video display output 736 to a video display 734. In a particular embodiment, information handling system 700 includes separate memories that are dedicated to each of processors 702 and 704 via separate memory interfaces. An example of memory 720 includes random access memory (RAM) such as static RAM (SRAM), dynamic RAM (DRAM), non-volatile RAM (NV-RAM), or the like, read only memory (ROM), another type of memory, or a combination thereof.

BIOS/UEFI module 740, disk controller 750, and I/O interface 770 are connected to chipset 710 via an I/O channel 712. An example of I/O channel 712 includes a Peripheral Component Interconnect (PCI) interface, a PCI-Extended (PCI-X) interface, a high speed PCI-Express (PCIe) interface, another industry standard or proprietary communication interface, or a combination thereof. Chipset 710 can also include one or more other I/O interfaces, including an Industry Standard Architecture (ISA) interface, a Small Computer Serial Interface (SCSI) interface, an Inter-Integrated Circuit ($I^2C$) interface, a System Packet Interface (SPI), a Universal Serial Bus (USB), another interface, or a combination thereof. BIOS/UEFI module 740 includes BIOS/UEFI code operable to detect resources within information handling system 700, to provide drivers for the resources, initialize the resources, and access the resources. BIOS/UEFI module 740 includes code that operates to detect resources within information handling system 700, to provide drivers for the resources, to initialize the resources, and to access the resources.

Disk controller 750 includes a disk interface 752 that connects the disk controller to HDD 754, to ODD 756, and to disk emulator 760. An example of disk interface 752 includes an Integrated Drive Electronics (IDE) interface, an Advanced Technology Attachment (ATA) such as a parallel ATA (PATA) interface or a serial ATA (SATA) interface, a SCSI interface, a USB interface, a proprietary interface, or a combination thereof. Disk emulator 760 permits SSD 764 to be connected to information handling system 700 via an external interface 762. An example of external interface 762 includes a USB interface, an IEEE 1394 (Firewire) interface, a proprietary interface, or a combination thereof. Alternatively, solid-state drive 764 can be disposed within information handling system 700.

I/O interface 770 includes a peripheral interface 772 that connects the I/O interface to add-on resource 774, to TPM 776, and to network interface 780. Peripheral interface 772 can be the same type of interface as I/O channel 712, or can be a different type of interface. As such, I/O interface 770 extends the capacity of I/O channel 712 when peripheral interface 772 and the I/O channel are of the same type, and the I/O interface translates information from a format suitable to the I/O channel to a format suitable to the peripheral channel 772 when they are of a different type. Add-on resource 774 can include a data storage system, an additional graphics interface, a network interface card (NIC), a sound/video processing card, another add-on resource, or a combination thereof. Add-on resource 774 can be on a main circuit board, on separate circuit board or add-in card disposed within information handling system 700, a device that is external to the information handling system, or a combination thereof.

Network interface 780 represents a NIC disposed within information handling system 700, on a main circuit board of the information handling system, integrated onto another component such as chipset 710, in another suitable location, or a combination thereof. Network interface device 780 includes network channels 782 and 784 that provide interfaces to devices that are external to information handling system 700. In a particular embodiment, network channels 782 and 784 are of a different type than peripheral channel 772 and network interface 780 translates information from a format suitable to the peripheral channel to a format suitable to external devices. An example of network channels 782 and 784 includes InfiniBand channels, Fibre Channel channels, Gigabit Ethernet channels, proprietary channel architectures, or a combination thereof. Network channels 782 and 784 can be connected to external network resources (not illustrated). The network resource can include another information handling system, a data storage system, another network, a grid management system, another suitable resource, or a combination thereof.

Management device 790 represents one or more processing devices, such as a dedicated baseboard management controller (BMC) System-on-a-Chip (SoC) device, one or more associated memory devices, one or more network interface devices, a complex programmable logic device (CPLD), and the like, that operate together to provide the management environment for information handling system 700. In particular, management device 790 is connected to various components of the host environment via various internal communication interfaces, such as a Low Pin Count (LPC) interface, an Inter-Integrated-Circuit (I2C) interface, a PCIe interface, or the like, to provide an out-of-band (OOB) mechanism to retrieve information related to the operation of the host environment, to provide BIOS/UEFI or system firmware updates, to manage non-processing components of information handling system 700, such as system cooling fans and power supplies. Management device 790 can include a network connection to an external management system, and the management device can communicate with the management system to report status information for information handling system 700, to receive BIOS/UEFI or system firmware updates, or to perform other task for managing and controlling the operation of information handling system 700. Management device 790 can operate off of a separate power plane from the components of the host environment so that the management device receives power to manage information handling system 700 when the information handling system is otherwise shut down. An example of management device 790 may include a commercially available BMC product that operates in accordance with an Intelligent Platform Management Initiative (IPMI) specification, a Web Services Management (WSMan) interface, a Redfish Application Programming Interface (API), another Distributed Management Task Force (DMTF), or other management standard, and can include a Integrated Dell Remote Access Controller (iDRAC), or the like. Management device 790 may further include associated memory devices, logic devices, security devices, or the like, as needed or desired.

Although only a few exemplary embodiments have been described in detail herein, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

The above-disclosed subject matter is to be considered illustrative, and not restrictive, and the appended claims are intended to cover any and all such modifications, enhancements, and other embodiments that fall within the scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. A mobile computing system, comprising:
   a case; and
   a frame installed into the case, wherein components of the mobile computing system are affixed to the frame, wherein the frame includes a first section and a second section, the first section being flexibly coupled to the second section by at least one first flexible joint and is not otherwise rigidly coupled to the second section, and wherein the frame consists of a single molded piece.

2. The mobile computing system of claim 1, wherein the frame is fabricated via an injection molding process.

3. The mobile computing system of claim 2, wherein, subsequent to removal from a mold, the frame is subject to shrinkage.

4. The mobile computing system of claim 3, wherein in installing the frame into the case, the first section is pushed toward the second section to compress the first flexible joint.

5. The mobile computing system of claim 3, wherein in installing the frame into the case, the first section is pulled away from the second section to expand the first flexible joint.

6. The mobile computing system of claim 1, wherein the frame includes a third section being flexibly coupled to the first section by at least one second flexible joint and is not otherwise rigidly coupled to the first section.

7. The mobile computing system of claim 6, wherein the second flexible joint is perpendicular to the first flexible joint.

8. The mobile computing system of claim 1, wherein the first flexible joint is an S-shaped joint.

9. The mobile computing system of claim 1, wherein the first flexible joint is an V-shaped joint.

10. A method, comprising:
providing a case for a mobile computing system;
installing a frame into the case, wherein the frame includes a first section flexibly coupled to a second section by at least one flexible joint but not otherwise rigidly coupled to the second section, and wherein the frame consists of a single molded piece; and
affixing components of the mobile computing system to the frame.

11. The method of claim 10, wherein, in fabricating the frame, the method further comprises:
fabricating the frame via an injection molding process.

12. The method of claim 11, wherein, subsequent to removal from a mold, the frame is subject to shrinkage.

13. The method of claim 12, wherein in installing the frame into the case, the method further comprises:
pushing the first section toward the second section to compress the first flexible joint.

14. The method of claim 12, wherein, in installing the frame into the case, the method further comprises:
pulling the first section away from the second section to expand the first flexible joint.

15. The method of claim 10, wherein the frame includes a third section being flexibly coupled to the first section by at least one second flexible joint and is not otherwise rigidly coupled to the first section.

16. The method of claim 15, wherein the second flexible joint is perpendicular to the first flexible joint.

17. The method of claim 10, wherein the first flexible joint is an S-shaped joint.

18. The method of claim 10, wherein the first flexible joint is an V-shaped joint.

19. A frame for a case of a mobile computing system, comprising:
a first section; and
a second section flexibly coupled to the first section by at least one flexible joint but not otherwise rigidly coupled to the first section, wherein the frame is fabricated as a single molded piece, and wherein components of the mobile computing system are affixable to the frame.

20. The mobile computing system of claim 19, wherein in installing the frame into the case, the first section is pushed toward the second section to compress the flexible joint.

* * * * *